(12) United States Patent
van den Berg et al.

(10) Patent No.: US 7,364,030 B2
(45) Date of Patent: Apr. 29, 2008

(54) APPARATUS FOR CONVEYING OBJECTS

(75) Inventors: Wouter van den Berg, Voorburg (NL);
Michiel Braskamp, Nootdorp (NL);
Erik van Wijngaarden, Hengelo (NL)

(73) Assignee: FPS Food Processing Systems B.V. (NL)

( * ) Notice: Subject to any disclaimer, the term of this patent is extended or adjusted under 35 U.S.C. 154(b) by 0 days.

(21) Appl. No.: 10/567,643

(22) PCT Filed: Aug. 16, 2004

(86) PCT No.: PCT/NL2004/000580

§ 371 (c)(1),
(2), (4) Date: Jan. 29, 2007

(87) PCT Pub. No.: WO2005/016799

PCT Pub. Date: Feb. 24, 2005

(65) Prior Publication Data

US 2007/0158165 A1    Jul. 12, 2007

(30) Foreign Application Priority Data

Aug. 18, 2003   (EP)   .................... 03077601

(51) Int. Cl.
B65G 47/90   (2006.01)
B65G 17/32   (2006.01)

(52) U.S. Cl. .................. 198/387; 198/383; 198/803.14

(58) Field of Classification Search ........... 198/370.01, 198/383, 387, 779, 803.14; 294/902; 209/617, 209/618
See application file for complete search history.

(56) References Cited

U.S. PATENT DOCUMENTS 4,411,366 A    10/1983   De Greef
4,488,637 A  * 12/1984   Loeffler .................... 198/803.9
4,730,719 A  *  3/1988   Brown et al. ............... 198/387
5,042,637 A  *  8/1991   LaVars et al. ......... 198/370.02
5,181,596 A  *  1/1993   Warkentin ............. 198/370.05
5,190,137 A  *  3/1993   Tas .............................. 198/387
5,230,394 A  *  7/1993   Blanc ......................... 177/145
5,244,100 A  *  9/1993   Regier et al. ............... 209/556
5,267,654 A  * 12/1993   Leverett ..................... 209/538
5,280,838 A  *  1/1994   Blanc ......................... 209/552
5,306,877 A  *  4/1994   Tas .............................. 177/145
5,474,167 A  * 12/1995   Warkentin ............... 198/890.1
5,626,236 A  *  5/1997   Hiebert ....................... 209/538
5,703,332 A    12/1997   Tas
5,855,270 A  *  1/1999   Throop et al. ............... 198/394
5,904,236 A  *  5/1999   Affeldt et al. ........... 198/464.4
6,079,542 A  *  6/2000   Blood ......................... 198/384

(Continued)

Primary Examiner—Douglas A Hess
(74) Attorney, Agent, or Firm—Stites & Harbison PLLC; Marvin Petry

(57) ABSTRACT

An apparatus for conveying objects such as fruits, comprises a first endless conveyor, with conveying elements such as diabolos connected thereto. A conveying position is defined between at least two conveying elements. A second endless conveyor, with product carriers connected thereto, comprises gripper hands, for transferring objects from between the conveying elements. The second conveyor is in the direct proximity of the first conveyor. The conveying elements comprise grooves in a direction perpendicular to the conveyor, and the gripper hand has fingers. A distance between the fingers corresponds to a distance between the grooves of the conveying elements such that upon transfer of the objects by the gripper hand, the fingers are positioned at least partly under the objects in groove ends of the grooves.

9 Claims, 1 Drawing Sheet

U.S. PATENT DOCUMENTS

| | | | |
|---|---|---|---|
| 6,148,989 A * | 11/2000 | Ecker | 198/387 |
| 6,234,300 B1 | 5/2001 | De Vos et al. | |
| 6,452,118 B1 * | 9/2002 | van Pinxteren et al. | 177/145 |
| 6,454,101 B1 * | 9/2002 | Doornekamp et al. | 209/668 |
| 6,691,854 B1 * | 2/2004 | De Greef | 198/395 |
| 6,742,647 B2 * | 6/2004 | De Greef | 198/470.1 |
| 7,137,501 B2 * | 11/2006 | Van Wijngaarden et al. | 198/384 |

* cited by examiner

APPARATUS FOR CONVEYING OBJECTS

The present invention relates to an apparatus for conveying objects and, in particular, an apparatus comprising conveying elements and gripper hands for transferring objects from between conveying elements.

BACKGROUND OF THE INVENTION

Prior conveyor systems include apparatus known from EP 687508 of the present applicant. The sorting machine described therein comprises, substantially, two endless conveyors, i.e. a first roller conveyor and a second roller conveyor starting above an end part of the roller conveyor, having grippers as carrier elements which grippers each consist of a combination of two gripper halves for carefully transferring articles, objects or products such as fruit, more in particular apples, pears, paprika's, kiwis, peaches et cetera, from the roller conveyor and conveying these further to the proper unloading station for further discharge and packaging. Especially in the market of sorting delicate products such as fruits, this machine has yielded good results because with these grippers, damaging the products to be transferred is prevented and avoided to a large extent.

However, it will be clear that with objects of different sizes, gripping may still lead to damage. With large fruits for instance, the springy, clamping action of the gripper halves may produce sleepy spots, while small fruits such as kiwis, after being transferred, can still roll from the halves as the ends of the gripper halves contact each other at their bottom sides, thereby gripping the kiwis as such less well.

SUMMARY OF THE INVENTION

In order to further improve the above-outlined construction for conveying in particular delicate objects, the apparatus according to the present invention is characterized in that, at least in the surfaces which support the objects at the moment of transfer by at least one single gripper hand, the conveying elements comprise grooves in a direction perpendicular to the conveyor, and in that the gripper hand comprises fingers, while the distance between the fingers corresponds to the distance between the grooves of the conveying elements such that upon transfer of the objects by the gripper hand, the fingers are positioned at least partly below the objects in the groove ends of the grooves.

With great advantage, this combination of conveying elements with grooves and the gripper hand mentioned can transfer any type of fruit so that sorting machines provided with such combinations will find general utility. In a very suitable manner, the gripper hand forms a cup-shaped support, thus avoiding any clamping engagement.

In a further embodiment, the invention is characterized in that the conveying elements are diabolos with circumferential surfaces of which at least one half is provided with grooves, while the diabolos are further provided with guides for directing the diabolos while the guides are passed over a transfer guide and such one half is positioned at the upper side.

What is thus achieved in a suitable manner is that the conveying elements and gripper hands will always assume the correct position relative to each other.

In particular, the invention is characterized in that the grooves substantially consist of groove ends which are in one line.

In a further elaboration, the product carrier for a single product or object comprises two gripper hands which are moved from both sides from the groove ends inwards and which, upon transfer, support the product or object.

More in particular, the two conveyors are positioned in one line, one above the other, while the gripper hands are virtually of the same size, the gripper hands being connected to a weighing unit while an upward guide is provided with which, at least virtually immediately after transfer of an object by the gripper hands, the gripper hands are guided upwards, while the gripper hands hold the transferred object at at least a limited distance above the conveying elements.

With this last feature it is achieved in a suitable manner that immediately after transfer of the objects, no further damage will occur because the paths followed by the gripper hands on the one side and the conveying elements on the other side are completely separated.

BRIEF DESCRIPTION OF THE DRAWINGS

The present invention will be elucidated with reference to a drawing.

In the drawing.

DETAILED DESCRIPTION

Figure 1:
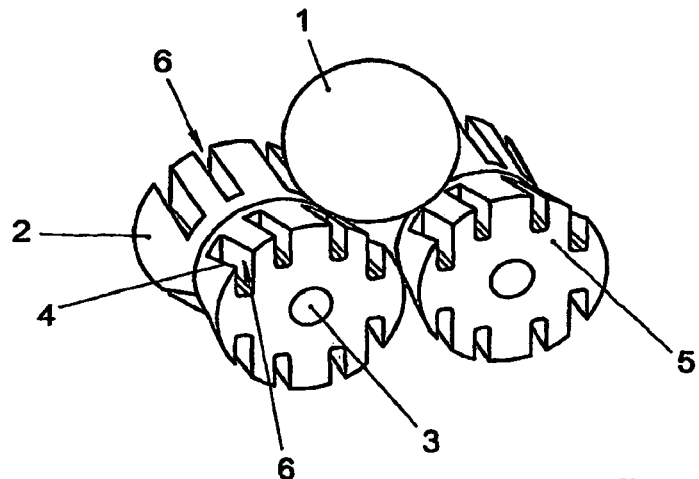
FIG. 1 shows a perspective view of the conveying elements of the first conveyor.

In the different Figures, the same parts have the same reference numerals.

In FIG. 1, an object 1, for instance products or articles such as fruits or balls, are on two conveying elements 2, together defining a conveying position. In the embodiment shown, the conveying elements are formed by diabolos, each having an axle 3, typically serving as rotation axis with which the diabolos, and hence the conveyed objects, rotate, for instance for inspection when passing cameras.

With these axles 3, generally positioned horizontally, the diabolos are connected to an endless conveyor (not shown) with which the objects 1 can be conveyed to, for instance, discharge units, in particular discharge or packaging paths, for further treatment, in particular packaging. Parallel to the axles and perpendicular to the conveying direction, grooves 4 have been provided in these diabolos 2, the grooves having groove ends 6. In the elaboration shown, no continuous grooves are used, but the grooves substantially consist of groove ends 6 which are in line with each other. In the elaboration shown, it can be seen that both diabolo halves 5 are provided with such grooves.

Figure 2:
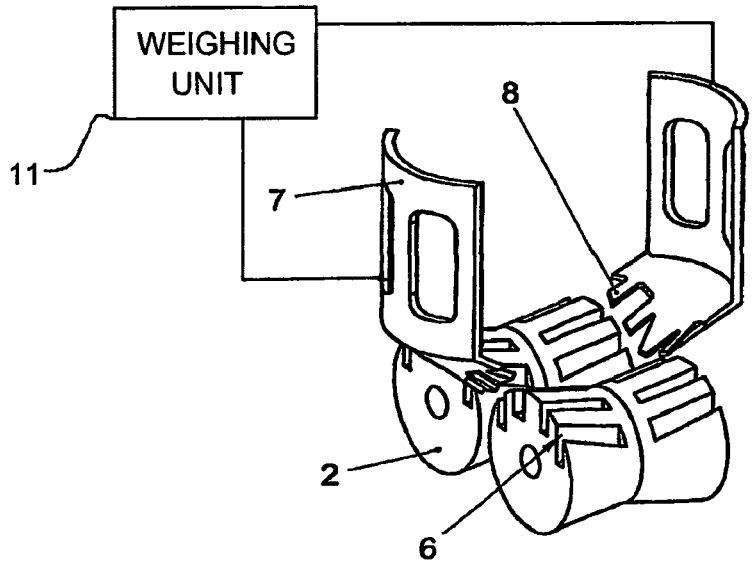
FIG. 2 shows a perspective view of two conveying elements of the first conveyer, in combination with the gripper hands connected to the second conveyor.

In FIG. 2, the diabolos 2, now provided with grooves on only a part of the supporting surface, are represented in combination with gripper hands 7. These gripper hands 7 have fingers 8 at their ends, the fingers being positioned precisely above the grooves. At the location of the conveying position, in the middle, a somewhat larger finger has been provided. In the situation represented here, both gripper hands are equally large and are carried along by and connected to an endless conveyor (not shown) which is arranged above, and in line with the conveyor of the conveying elements. The opened position is shown from which the gripper hands can be moved towards each other, with the fingers in the grooves, and can thus support an object or product.

Figure 3:
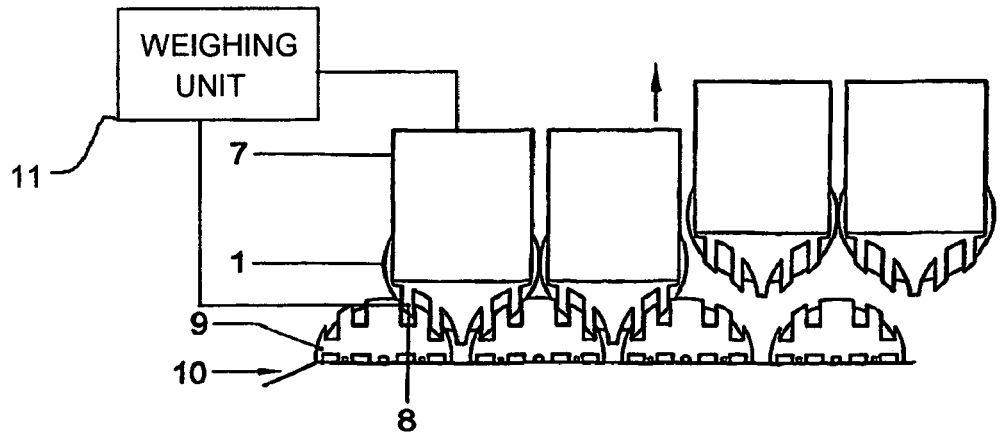
FIG. 3 shows a side view of the conveying elements and the gripper hands prior to, during and after transfer of objects.

In FIG. 3, again, the combination is shown in a side view. What is shown is the situation just prior to, during, and just after transfer of the objects 1 by the gripper hands 7. Objects 1 are partly on diabolos carried along by the first endless conveyor, and are partly transferred by the gripper hands 7 of the second endless conveyor. Further, a transfer guide 10 is represented, more in particular a gradient against which guides 9 on the sides of the diabolos rotate so that the diabolos are directed such that the halves 5 are positioned having the grooves at the upper side. As the gripper hands 7 and the grooves are exactly in line, when the two gripper hands move towards each other, the fingers will be slid exactly into the grooves and hence be able to support and transfer the objects 1. Immediately afterwards, the gripper hands will be guided upwards by an upwards guide (not represented) in the direction indicated by the arrow in this Figure, so that the objects transferred by the gripper hands are positioned at at least a limited distance above the first conveyor. Any damage that may occur is thus prevented Optionally, the gripper hands 7, 8 are connected to a weighing unit 11 (shown schematically in FIGS. 2 and 3).

Not shown as an exemplary embodiment in a Figure is the embodiment in which per gripper, instead of two gripper hands, one gripper hand is provided, the diabolo roller conveying first conveyor and the gripper hand conveying second conveyor being arranged next to each other, while the objects are lifted from the first conveyor by the one gripper hand which is provided with fingers that can reach into grooves in the diabolos.

Nor is there a detailed description of manners of moving and displacing the gripper hands. This can be effected in many manners. For instance with cams and cam following elements, or also with springs, in particular draw springs or compression springs, depending on the manner of attaching and locking thereof.

It will be clear to any skilled person that minor modifications in the elaborations represented are possible without departing from the scope and spirit of the present invention.

The invention claimed is:

1. An apparatus for conveying objects, said apparatus comprising:
   a first endless conveyor with conveying elements, the first endless conveyor having a conveying position defined between at least two conveying elements, one of the two conveying elements being downstream and the other of the conveying elements being upstream, as viewed in a direction of travel of the first endless conveyor; and
   a second endless conveyor, with product carriers connected thereto, comprising gripper hands, for transferring the objects from between the conveying elements, the second conveyor being provided in the direct proximity of the first endless conveyor wherein, at least in the surfaces supporting the objects at the moment of transfer by at least one single gripper hand, the conveying elements comprise grooves in a direction perpendicular to the conveyor, and said gripper hand has fingers, while a distance between the fingers corresponds to a distance between the grooves of the conveying elements such that upon transfer of the objects by said gripper hand, the fingers are positioned at least partly under the objects in groove ends of the grooves.

2. The apparatus according to claim 1, wherein the conveying elements are diabolos with circumferential surfaces of which at least one half is provided with grooves, while the diabolos are further provided with guides for directing the diabolos while the guides are passed over a transfer guide and are positioned with said one half at the upper side.

3. The apparatus according to claim 1, wherein the grooves substantially consist of groove ends which are in one line.

4. The apparatus according to claim 1, wherein the product carrier for a single product or object consists of two gripper hands which are moved from both sides from the groove ends inwards and, upon transfer, both support the product or object.

5. The apparatus according to claim 1, wherein the two conveyors are positioned in line, one above the other.

6. The apparatus according to at least claim 4, wherein the gripper hands are virtually of the same size.

7. The apparatus according to claim 1, wherein the gripper hands are connected to a weighing unit.

8. The apparatus according to claim 1, wherein, further, an upward guide is provided with which at least virtually immediately after transfer of an objects by said gripper hand, this gripper hand is carried along upwards while this gripper hand and the transferred objects are positioned at at least a limited distance above the conveying elements.

9. The apparatus of claim 1, wherein the conveying elements comprise diabolos.

* * * * *